United States Patent [19]

Yamamuro

[11] Patent Number: 4,926,407
[45] Date of Patent: May 15, 1990

[54] OPTICAL DATA PROCESSOR

[75] Inventor: Mikio Yamamuro, Kawasaki, Japan

[73] Assignee: Kabushiki Kaisha Toshiba, Kawasaki, Japan

[21] Appl. No.: 137,673

[22] Filed: Dec. 24, 1987

[30] Foreign Application Priority Data

Dec. 25, 1986 [JP] Japan .................... 61-311530

[51] Int. Cl.⁵ .................................... G11B 7/00
[52] U.S. Cl. .................... 369/44.11; 369/124
[58] Field of Search ............ 369/44, 45, 46, 124

[56] References Cited

U.S. PATENT DOCUMENTS 4,654,515  3/1987  Ando ..................... 369/45
4,663,750  5/1987  Hamanaka et al. ............ 369/45

FOREIGN PATENT DOCUMENTS 0127845 12/1984 European Pat. Off. .
3438260A1 5/1985 Fed. Rep. of Germany .

OTHER PUBLICATIONS

English translation of German Patent Office Action dated 6/14/88.

Primary Examiner—Steven L. Stephan
Attorney, Agent, or Firm—Finnegan, Henderson, Farabow, Garrett and Dunner

[57] ABSTRACT

Two detect signals for correcting a detracking, which is derived from a first photo sensor are supplied to a differential amplifier and an adder, through amplifiers. The amplifiers amplify the supplied detect signals at a first amplification degree in the reproduction mode to reproduce the information from an optical disc. In the record mode, a second amplification degree is used, which is 1/A in the reproduction mode, when the average level of each detect signal is A times that in the reproduction mode. The difference signal between the detect signal from the differential amplifier and the sum signal of them from the adder are supplied to a normalizer. The normalizer divides the difference signal by the sum signal. An objective is moved by the output signal from the normalizer, to correct the detracking. A defocus is corrected, in the same manner as the detracking correction, by using two deteor signals for correcting the defocus from a second photo sensor.

6 Claims, 4 Drawing Sheets

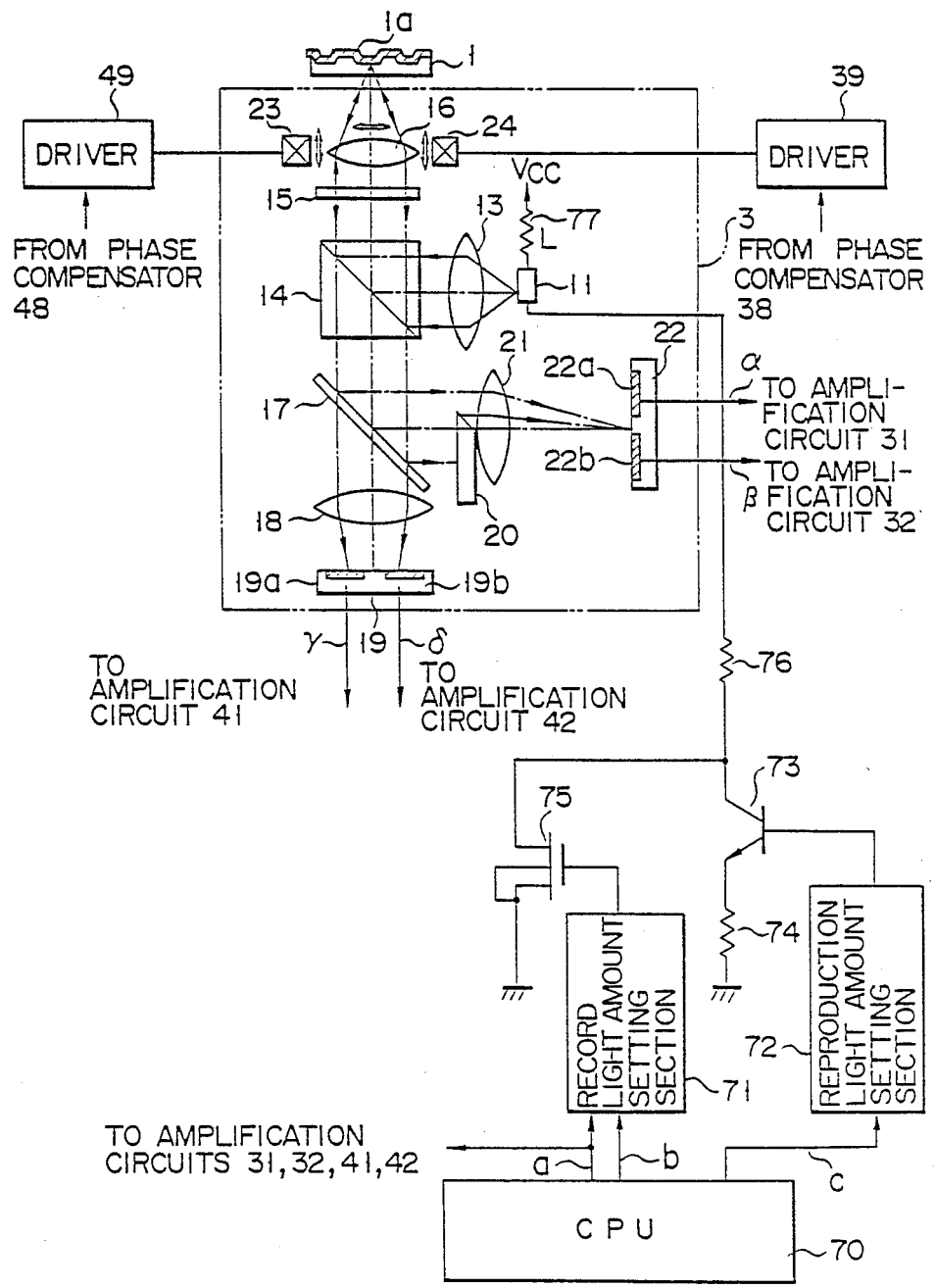
F I G. 1A

OPTICAL DATA PROCESSOR

BACKGROUND OF THE INVENTION

This invention relates to an optical data processor for recording and reading out data for optical discs by using a focused beam.

Data filing systems for filing a tremendous number of documents, and drawings, have been developed and put to practical use. In the system, the data on the documents are optically and two-dimensionally scanned, and collected in the form of electrical data. The data is recorded into an image recorder. The recorded data is retrieved, and reproduced in the form of hardcopy or softcopy, if necessary. In the filing system of this type, an optical disc device (optical information processor) has recently been used for such an image recorder.

The optical disc device uses an optical disc for recording the data in a spiral fashion. In recording or reproducing the data, an optical head is driven by a linear motor and rectilinearly moved in the radial direction of the disc.

In the optical disc device, an error is inevitable in mounting an objective to the optical head, and causes the optical beam to inaccurately land at the target position on the optical disc when focusing or tracking of the objective is performed. To cope with this, the difference between two types of detect signals for focusing is calculated. The current based on the difference signal is fed through a voice coil for driving the objective. The objective is driven to the correct focal position. Similarly, a difference between two types of detect signals for tracking is calculated. The current based on the difference signal is fed to the objective drive coil, to move the objective to a correct tracking position.

The focusing and tracking controls must be stable against the detect level difference of the reflecting signal from the optical disc in the record and reproduction mode. To obtain stable control, a divider for normalizing the drive signal (for dividing the difference of the two different detect signals by the sum of them) is used. Additionally, a measure has been taken to eliminate physical error such as caused by the sensitivity error of detectors and the error due to the incorrect position of the objective in its mounting. In this measure, the offset correcting voltage is added to the drive signal.

In the optical disc device as mentioned above, however, the two detect signals, when the optical filing system is in the record mode, are much larger than those when in the read mode, and frequently reach values several times the latter. The difference of these signals between the record and read modes has little influence on the difference between the two detect signals, but greatly influences the sum of them. In the extreme case, the sum in the record mode is several times that in the read mode. If the gain of the system is set such that the sum signal is not saturated at the power voltage, the sum signal is too small in the read mode so that the operation of the divider may be unstable. The divider, which operates stably against the too small sum signal, could be realized, but is expensive.

To cope with the great increase of the detected light amount in the record mode, the divider must be designed to have a wide dynamic range and a high accuracy of calculation. This represents a difficult application of the device and a high cost to manufacture the device.

SUMMARY OF THE INVENTION

Accordingly, an object of this invention is to provide an optical data processor which does not require difficult-to-use and expensive parts, and can perform stable and exact focusing and tracking controls.

To achieve the above object, there is provided a optical data processor for recording and reproducing data to and from optical memory, comprising: means for generating and emitting a recording light beam to effect the recording of the data to the optical memory and a reproducing light beam to effect the reproducing of the data from the optical memory; means for focusing the light beam emitted from the emitting means onto the optical memory; means for detecting the light beam reflected from the optical memory and for obtaining first and second detect signals, the first detect signal representing a degree of shifting of a focal point of the light beam in a positive direction from an exact focal point on the optical memory, and the second detect signal representing a degree of shifting of the focal point of the light beam in a negative direction from the exact focal point on the optical memory; means for amplifying the detect signals derived from the detecting means at a first amplification degree when the emitting means emits the reproducing light beam, and at a second amplification degree different from the first amplification degree when the emitting means emits the recording light beam; means for obtaining a drive signal corresponding to the degree of shifting of the focal point of the light beam by processing the detect signals from the amplifying means; and means for focusing the light beam on the exact focal point on the optical memory, according to the drive signal obtained by the processing means.

BRIEF DESCRIPTION OF THE DRAWINGS

Figs. 1A and 1B show circuit diagrams of an optical disc device as an embodiment of an optical data processor according to this invention;

DETAILED DESCRIPTION OF THE PREFERRED EMBODIMENTS

Figure 1B:
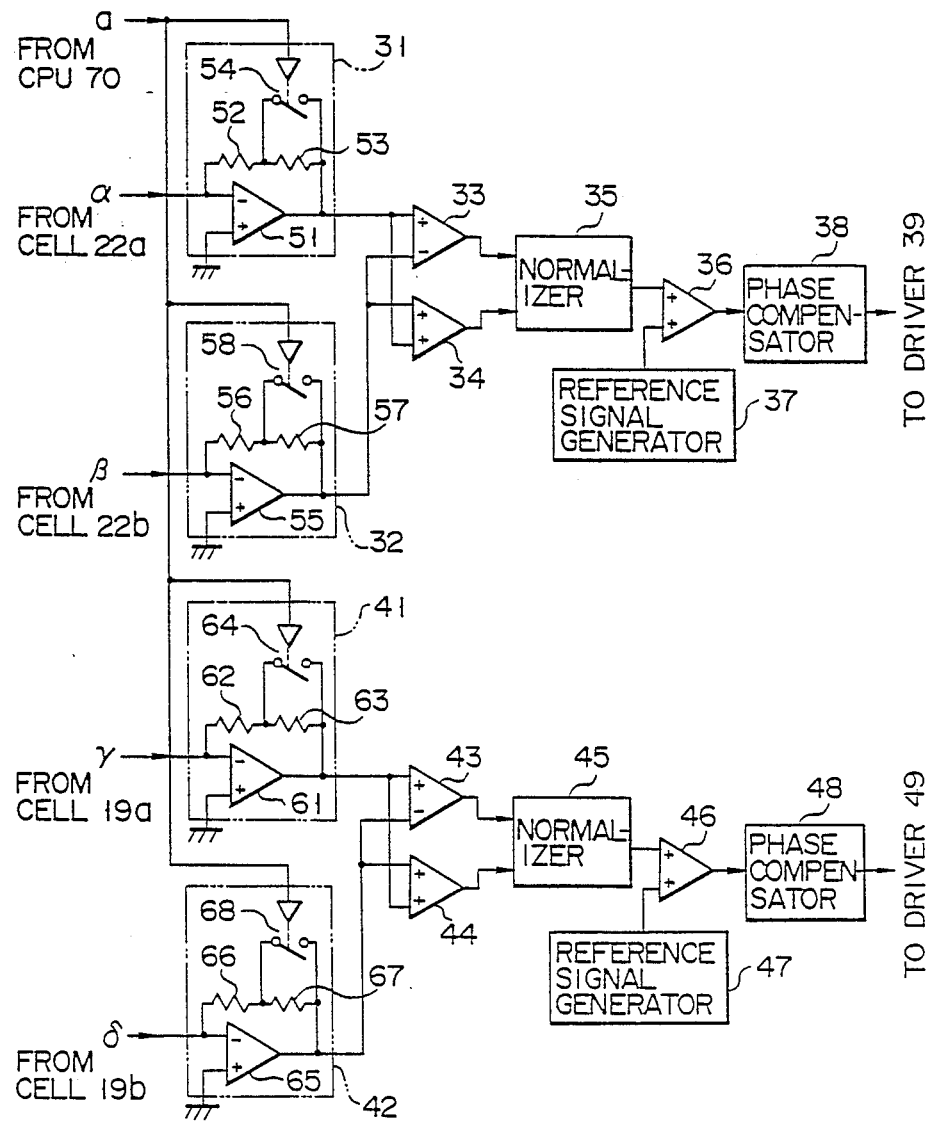

Figs. 1A and 1B show schematic illustrations of an optical data processor, for example, an optical disk device, according to this invention. Optical disc (recording medium) 1 is driven by a motor (not shown) and moved at a constant linear velocity with respect to optical head 3. Optical disc 1 is constructed such that the surface of a circular substrate made of glass or plastic is coated with metal of tellurium or bismuth, in a doughnut fashion.

Optical head 3 for recording and reading out data is located under the reverse side of optical disc 1. Optical head 3 contains semiconductor laser (light source) 11, which emits laser beam L of the divergence type. To write (record) the data into the recording film 1a of optical disc 1, the intensity of laser beam L is modulated by the data to be recorded. To read (reproduce) the data from the film 1a, the laser beam L at a fixed intensity is used, or emitted.

The laser beam L emitted from semiconductor laser 11 is collimated by collimator lens 13, and directed to polarized beam splitter 14. The laser beam L directed to this beam splitter 14 is reflected at the splitter 14. The reflected laser beam L passes through ¼ wave length plate 15 to objective 16. The objective focuses the laser beam L toward the recording film 1a of optical disc 1.

Objective 16 is movably supported and movable in the optical axis and in the direction orthogonal to the optical axis. When objective 16 is set at a predetermined position, the beam waist of the converging laser beam L emitted from objective 16 is projected on the surface of the recording film 1a of optical disc 1, so that the minimum beam spot is formed on the recording film 1a of optical disc 1. Under this condition, objective 16 is placed in the in-focus and intrack state, and the data read/write is allowed.

The diverging laser beam L reflected at the recording film 1a of optical disc 1 is converted into a beam of parallel rays by objective 16. The beam L of parallel rays pass through ¼ wave length plate 15, and is returned to polarized beam splitter 14. Since the laser beam L goes and returns through ¼ wave length plate 15, the plane of polarization is rotated by 90°, when compared with that of the light beam as reflected by the splitter 14. The laser beam L with the 90° rotated plane passes through polarized beam splitter 14, without its reflection by the beam splitter 14.

The laser beam L passed through the beam splitter 14 is split into two beams, the first beam for a detracking (out-of-track) detecting system, and the second beam for a defocus (out-of-focus) detecting system. This is done by half mirror 17. The first beam L hits first photo sensor 19 through first condenser lens 18. First photo sensor 19 is made up of photo cells 19a and 19b for converting the light projected by first condenser lens 18 into electrical signals. Photo cells 19a and 19b output "γ" and "δ" signals, respectively.

The second laser beam L split by half mirror 17 is applied to knife edge (light extracting member) 20. This knife edge 20 extracts only the component of the second laser beam L which passes through the area apart from the optical axis. Second photo sensor 22 is made up of photo cells 22a and 22b for converting the laser beam as passed through second condenser lens 21, into electrical signals. These photo cells 22a and 22b output "α" and "β" signals, respectively.

Of the output signals of optical head 3, the "γ" and "δ" signals of photo cells 19a and 19b are used for correcting the detracking and for the signal reproduction. The "α" and "β" signals of photo cells 22a and 22b are used for focusing correction, i.e., for correcting the defocus condition.

The output signals of "α" and "β" from photo cells 22a and 22b are supplied to amplifier circuits 31 and 32, respectively, as shown in FIG. 1B. These amplifiers 31 and 32 amplify these output signals from photo cells 22a and 22b at the amplification degree, which varies depending on the presence or absence of a signal "a" representative of an in-record condition derived from CPU 70, to be given later.

Amplifier 31 is made up of differential amplifier 51, a series circuit of resistors 52 and 53, which is provided between the output terminal and the inverting input terminal of differential amplifier 51, and analog switch 54 connected across resistor 53. The noninverting input terminal of differential amplifier 51 is grounded.

Amplifier 32 is made up of differential amplifier 55, a series circuit of resistors 56 and 57, which is provided between the output terminal and the inverting input terminal of differential amplifier 55, and analog switch 58 connected across resistor 57. The noninverting input terminal of differential amplifier 55 is grounded.

Analog switches 54 and 58 are turned on and off by the in-record signal "a" from CPU 70. When analog switches 54 and 58 are turned on, the amplification degrees of the related amplifiers 31 and 32 become small. When these switches are turned off, the amplification degrees of these amplifiers become large. Specifically, in the read or reproduction mode, these signals are amplified at given amplification degrees. In the record mode, the amplification degrees are reduced to 1/A, if the detect level of the detector is A times that in the record mode.

The output signal from amplifier circuit 31 is supplied to the non-inverting input terminal of differential amplifier 33 as a subtractor. The output signal from amplifier circuit 32 is supplied to the inverting input terminal of differential amplifier 33. The output signals of amplifiers 31 and 32 are supplied to the input terminal of adder 34 as an adder circuit. The outputs of differential amplifier 33 and of adder 34 are supplied to normalizer 35.

Normalizer 35, which includes a divider (dividing circuit), divides the signal from differential amplifier 33 by the output signal from adder 34. Specifically, the divider divides a difference signal "$\alpha - \beta$" by the added signal "$60 + \beta$", to obtain a normalized signal "$60 - \beta$"/"$\alpha + \beta$", as a defocus detection signal. Even when the detect level of the photo sensor becomes different because the intensity of the laser beam L becomes different, for example when the system operation mode changes from the record mode to the read mode and vice versa, the normalizer always provides the fixed detect level.

It is assumed that in the reproduction mode, amplifiers 31 and 32 amplify the "α" and "β" signals at a B amplification degree, the difference signal is "$B\alpha - B\beta = B(\alpha - \beta)$", and the sum signal is "$B\alpha + B\beta = B(\alpha + \beta)$". Therefore, the normalized signal is "$B(\alpha - \beta)/B(\alpha + \beta) = (\alpha - \beta)/(\alpha + \beta)$". In the record mode, amplifiers 31 and 32 amplify the "α" and "β" signals at the amplification degree of B/A. In this mode, the detect signal is A times that in the reproduction mode. Therefore, the output signal of amplifier circuit 31 is "$B/A(A\alpha) = B\alpha$", so that the output signal of amplifier circuit 32 is "$B/A(A\beta) = B\beta$". As a result, the difference signal "$B\alpha - B\beta = B(\alpha - \beta)$", and the sum signal "$B\alpha + B\beta = B(\alpha + \beta)$". The normalized signal is $B(\alpha - \beta)/B(\alpha + \beta) = (\alpha - \beta)/(\alpha + \beta)$. This indicates that even when the detect level of the photo sensor becomes different because the intensity of the laser beam L becomes different, for example when the system operation mode changes from the record mode to the read mode and vice versa, the normalizer always provides the fixed detect level.

The output signal from normalizer 35 is supplied to one end of adder 36. The other end of adder 36 is supplied with a reference signal from reference signal generator 37. This generator 37 produces bias voltage (offset correction voltage) $\Delta x$ as a reference signal to optimally position the beam spot (focal position) through objective 16. Its value is set when it is set to the device.

Adder 36 adds together the defocus detection signal from normalizer 35 and the offset correction voltage derived from reference signal generator 37. The output signal of adder 36 is supplied to phase compensator 38. The compensator 38 compensates for the shift of the phase of the signal from adder 36, and supplies it to driver 39 shown in FIG. 1A. Driver 39 feeds the current based on the signal as supplied from phase compensator 38, to coil 24 for driving objective 16 in the vertical direction relative to the recording surface of film 1a of optical disc 1. As a result, objective 16 is driven to compensate for the defocus (shift from the focal position).

The output signals of "$\gamma$" and "$\delta$" from photo cells 19a and 19b are applied to amplifiers 41 and 42, respectively, as shown in FIG. 1B. These amplifiers 41 and 42 respectively amplify the signals from photo cells 19a and 19b at the amplification degrees, which depend on the presence or absence of the in-record signal "a" from CPU 70. Amplifier 41 is comprised of differential amplifier 61, a series circuit of resistors 62 and 63, which are provided between the output terminal and the inverting input terminal of the differential amplifier 61, and analog switch 64 across the resistor 63. The noninverting input terminal of differential amplifier 61 is grounded. Amplifier 42 is comprised of differential amplifier 65, a series circuit of resistors 66 and 67, which are provided between the output terminal and the inverting input terminal of the differential amplifier 65, and analog switch 68 across the resistor 67. The noninverting input terminal of differential amplifier 65 is grounded.

Analog switches 64 and 68 are turned on and off by the in-record signal "a" from CPU 70. When these switches are turned on, the amplification degrees of these switches amplifiers become small. When these are turned off, the amplification degrees become large. In the record mode, the amplification degrees are reduced to 1/A, if the detect level of the detector is A times that in the record mode.

The output signal from amplifier circuit 41 is supplied to the non-inverting input terminal of differential amplifier 43 as a subtractor. The output signal from amplifier circuit 42 is supplied to the inverting input terminal of differential amplifier 43. The output signals of amplifiers 41 and 42 are supplied to the input terminal of adder 44 as an adder circuit. The outputs of differential amplifier 43 and of adder 44 are supplied to normalizer 45.

Normalizer 45, which includes a divider (dividing circuit), divides the signal from differential amplifier 43 by the output signal from adder 44. Specifically, the divider divides a difference signal "$\gamma-\delta$" by the added signal "$\gamma+\delta$", to obtain a normalized signal "$\gamma-\delta$"/"$\gamma+\delta$", as a detracking detection signal. Even when the detect level of the photo sensor becomes different because the intensity of the laser beam L becomes different, for example when the system operation mode changes from the record mode to the read mode and vice versa, the normalizer always provides the fixed detect level.

It is assumed that in the reproduction mode, amplifiers 41 and 42 amplify the "$\gamma$" and "$\delta$" signals at a B amplification degree, the difference signal is "$B\gamma-B\delta=B(\gamma-\delta)$", and the sum signal "$B\gamma+B\delta=B(\gamma+\delta)$". Therefore, the normalized signal is "$B(\gamma-\delta)/B(\gamma+\delta)=(\gamma-\delta)/(\gamma+\delta)$". In the record mode, amplifiers 41 and 42 amplify the "$\gamma$" and "$\delta$" signals at the amplification degree of B/A. In this mode, the detect signal is A times that in the reproduction mode. Therefore, the output signal of amplifier circuit 41 is "$B/A(A\gamma)=B\delta$", so that the output signal of amplifier circuit 42 is "$B/A(A\delta)=B\delta$". As a result, the difference signal "$B\gamma-B\delta=B(\gamma-\delta)$", and the sum signal "$B\gamma+B\delta=B(\gamma+\delta)$". The normalized signal is $B(\gamma-\delta)/B(\gamma+\delta)=(\gamma-\delta)/(\gamma+\delta)$. This indicates that even when the detect level of the photo sensor becomes different because the intensity of the laser beam L becomes different, for example, when the system operation mode changes from the record mode to the read mode and vice versa, the normalizer always provides the fixed detect level.

The output signal from normalizer 45 is supplied to one end of adder 46. The other end of adder 46 is supplied with a reference signal from reference signal generator 47. This generator 47 produces bias voltage (offset correction voltage) $\Delta y$ as a reference signal to optimally position the beam spot (track position) through objective 16. Its value is set when it is set to the device.

Adder 46 adds together the detracking detection signal from normalizer 45 and the offset correction voltage derived from reference signal generator 47. The output signal of adder 46 is supplied to phase compensator 48. The compensator 48 compensates for the shift of the phase of the signal from adder 46, and supplies it to driver 49 shown in FIG. 1A.

Driver 49 feeds the current based on the signal as supplied from phase compensator 48, to coil 23 for driving objective 16 in the horizontal direction relative to the recording surface or film 1a of optical disc 1. As a result, objective 16 is driven to compensate for the detracking (shift from the track position).

CPU 70 executes the control of the overall system. CPU 70 responds to the record signal supplied from the external device (not shown), and outputs the in-record signal "a" and record data "b" to section 71 for setting the record light amount. Further, CPU 70 transfers control signal "c" to section 72 for setting the reproduction light amount, when receiving a reproduction request signal from the external device.

In the reproduction mode, reproduction light amount setting section 72 receives the control signal "c" from CPU 70 and outputs a drive signal to the base of NPN transistor 73. The collector of transistor 73 is grounded through resistor 74. Transistor 73 executes the current amplification in response to the drive signal from section 72. Transistor 73 feeds the amplified current to semiconductor laser 11, so that the reproduction laser beam is projected to optical disc 1, from semiconductor laser 11.

In the record mode, record light amount setting section 71 outputs an on/off control signal to the gate of FET (field effect transistor) 75, in response to the in-record signal "a" and record data "b", which are supplied from CPU 70. The source of FET 75 is grounded. The drain of FET 75 and the collector of transistor 73 are both connected to the power supply (Vcc), through resistor 76, semiconductor laser 11, and resistor 77 in this order. FET 75 is turned on by a control signal from record light amount setting section 71, so that a necessary current is fed to semiconductor laser 11.

The in-record signal "a" output from CPU 70 is transferred to analog switches 54, 58, 64, and 68 in amplifier circuits 31, 32, 41, and 42. Analog switches 54, 58, 64, and 68 are turned off by the signal "a".

The operation of the optical data processor thus arranged will be described. When the reproduction request signal is supplied from the external device (not shown), CPU 70 outputs control signal "c" to reproduction light amount setting section 72. Upon receipt of this signal, the setting section 72 feeds to the base of transistor 73 a drive signal based on the supplied control signal "c". The transistor 73 executes the current amplification according to the drive signal. As a result, semiconductor laser 11 emits continuous laser beam at low intensity.

When a record signal is supplied from the external device, CPU 70 outputs to record light amount setting section 71 the modulated record data "b" and the in-record signal "a". Upon receipt of this, setting section 71 outputs a control signal based on the modulating signal, to FET 75. FET 75 is interruptedly turned on and off by the control signal supplied. A large current is interruptedly fed to laser 11, which in turn emits a laser beam at high intensity. In this way, semiconductor laser 11 emits the high intensity laser beam as the record beam and the low intensity laser beam as the reproduction laser beam.

The laser beam L is collimated by collimator lens 13, and led to polarized beam splitter 14, and reflected at this splitter 14, and pass through ¼ wave length plate 15 and enters objective 16. The laser beam is finally focused toward the recording film 1a of optical disc 1, by means of objective 16.

Under this condition, in recording the information, a pit is formed on the track of optical disc 1, by the radiated laser beam at high intensity, or the recording laser beam. To reproduce the data, the low intensity laser beam, or the reproduction laser beam, is applied to the optical disc. The reproduction laser beam reflected at the optical disc is collimated by objective 16, and pass through ¼ wave length plate 15 again, and returns to polarized beam splitter 14. The plane of polarization of the laser beam L is rotated when compared with that of the laser beam after passing through splitter 14. That laser beam passes through and is not reflected at polarized beam splitter 14.

The laser beam L passed through the beam splitter 14 is split into two beams, the first beam for a detracking detecting system, and the second beam for a defocus detecting system. This is done by half mirror 17. The first beam L hits first photo sensor 19 through first condenser lens 18.

The second laser beam L split by half mirror 17 is applied to knife edge (light extracting member) 20. This knife edge 20 extracts only the component of the second laser beam L, which passes through the area apart from the optical axis. This component of the laser beam is applied to second photo sensor 22 after passing through second condenser lens 21. Photo cells 22a, 22b, 19a and 19b output signals based on the laser beams applied. These signals are applied to amplifiers 31, 32, 41, and 42. In this case, the in-record signal "a" has turned on analog switches 54, 58, 64, and 68. The amplification degrees of corresponding amplifiers 31, 32, 41, and 42 are 1/A that in the record mode, if the detect level of the photo sensor is A times that in the reproduction mode.

The focusing operation when the optical data processor is under such conditions will be described. The output signals from amplifiers 31 and 32 are supplied to differential amplifier 33 and adder 34, respectively. Differential amplifier 33 calculates the difference between the detect signals from photo cells 22a and 22b, to obtain a signal "$\alpha-\beta$", which in turn is applied to normalizer 35. Adder 34 sums the detect signals to obtain "$\alpha+\beta$", which in turn is applied to normalizer 35. Normalizer 35 divides the difference signal by the sum signal, to obtain "$\alpha-\beta$"/"$\alpha+\beta$", which is a normalized signal representing the defocus. The normalized signal is applied to adder 36.

Adder 36 adds the bias voltage (offset correction voltage) $\Delta x$ to the defocus detection signal from normalizer 35, to obtain "$\{(\alpha-\beta)/(\alpha+\beta)\}+\Delta x$", which in turn is applied to phase compensator 38. The signal is phase compensated by the phase compensator 38 and then is supplied to driver 39. According to the signal from phase compensator 38, driver 39 feeds a necessary current to coil 24. Objective 16 is driven in the vertical direction, to execute the focusing. The beam spot focused by objective 16 can be exactly positioned for focusing by the correction by the bias voltage, even if objective 16 is displaced from the correct position.

The tracking operation will be described. The output signals from amplifiers 41 and 42 are supplied to differential amplifier 43 and adder 44, respectively. Differential amplifier 43 calculates the difference between the detect signals from photo cells 19a and 19b, to obtain a signal "$\gamma-\delta$", which in turn is applied to normalizer 45. Adder 44 sums the detect signals to obtain "$\gamma+\delta$", which in turn is applied to normalizer 45. Normalizer 45 divides the difference signal by the sum signal, to obtain "$\gamma-\delta$"/"$\gamma+\delta$", which is a normalized signal representing the detracking. The normalized signal is applied to adder 46.

Adder 46 adds the bias voltage (offset correction voltage) $\Delta y$ to the detracking detection signal from normalizer 45, to obtain "$\{(\gamma-\delta)/(\gamma+\delta)\}+\Delta Y$", which in turn is applied to phase compensator 48. The signal is phase compensated by the phase compensator 48 and then is supplied to driver 49. According to the signal from phase compensator 48, driver 49 feeds a necessary current to coil 23. Objective 16 is driven in the horizontal direction, to execute the tracking. The beam spot by objective 16 can be exactly positioned for tracking by the correction by the bias voltage, even if objective 16 is displaced from the correct position.

Thus, when the detect levels as obtained are different as between the record mode and the reproduction mode, the physical contents of the offset correction voltage $\Delta x$ or $\Delta y$ does not vary, providing a stable control. Therefore, exact focusing and tracking are possible.

As described above, in other than the record mode, the low current is supplied to semiconductor laser 11. Therefore, in such mode, laser 11 emits a weak laser beam or reproduction laser beam L. The laser beam L is applied to the optical disc 1, in the same manner as the recording beam is applied. The reflected laser beam is collimated by objective 16, and directed to polarized beam splitter 14 via ¼ wave length plate 15. At this time, the laser beam L directed to splitter 14 goes and returns through the plate 15. Then, its plane of polarization is rotated by 90° when it is compared with that as reflected by splitter 14. Therefore, the laser beam L passes through splitter 14 and is not reflected by it. The laser beam L after passing through splitter 14 is applied to first photo sensor 19 via condenser lens 18. Upon receipt of this, photo cells 19a and 19b output the signal based on the irradiated laser beam. These signals are applied to amplifiers 41 and 42.

The reproduction of data by the optical data processor will be described. CPU 70 outputs a control signal "c" to reproduction light amount setting section 72. Laser 11 emits a continuous weak laser beam L. Photo cells 22a, 22b, 19a, and 19b supply the output signals to amplifiers 31, 32, 41, and 42, as in the record mode. At this time, the in-record signal "a" is not issued from CPU 70. Therefore, analog switches 54, 58, 64, and 68 are in an off state, and the corresponding amplifiers 31, 32, 41, and 42 are at certain amplification degrees.

The focusing is performed by the output signals from amplifiers 31 and 32, and the tracking is performed by amplifiers 41 and 42. The output signals from photo cells 19a and 19b are digitized by a digitizer (not shown), and the data is read out or reproduced.

As described above, in the present invention, the laser beam emitted from the semiconductor laser is focused on the optical disc by the objective. From the laser beam reflected at the optical disc, at least two types of signals are detected. The detected signals are amplified by amplifiers at a certain amplification degree, in the record mode. In the reproduction mode, these are amplified at the amplification degree 1/A, when the detect level of the photo sensor in the record mode is A times that in the reproduction mode. After the amplified signal is normalized, it is added with the reference signal, and is used for driving the objective. In other words, the amplification degrees of the amplifiers are changed according to the operation modes, the record mode and the reproduction mode, to keep the amplified detected values substantially constant. This substantially fixes the operating point of the divider.

If the gains of amplifiers 31 and 32 are set such that "record mode gain/reproduction mode gain =1/A", the output signal from normalizer 35 is: "(in-record) $=(\alpha-\beta)/(\alpha+\beta)$" and "(reproduction)$=(\alpha/A -\beta/A)/(\alpha/A +\beta/A)=(\alpha-\beta)/(\alpha+\beta)$", and (in-record)=(reproduction). If the gains of amplifiers 41 and 42 are set such that "record mode gain/reproduction mode gain =1/A", the output signal from normalizer 45 is: "(in-record)$=(\gamma-\delta)/(\gamma+\delta)$" and "(reproduction)$=(\gamma/A-\delta A)/(\gamma/A+\delta/A)=(\gamma-\delta)/(\gamma+\delta)$", and (in-record)=(reproduction).

The above technical fact indicates that a wide dynamic range is not required for the normalizer, or the divider, viz., a high precision divider is not required. Therefore, there is no need for dividers that are difficult-to-use and expensive, and stable and accurate focusing and tracking can be realized.

Figure 2:
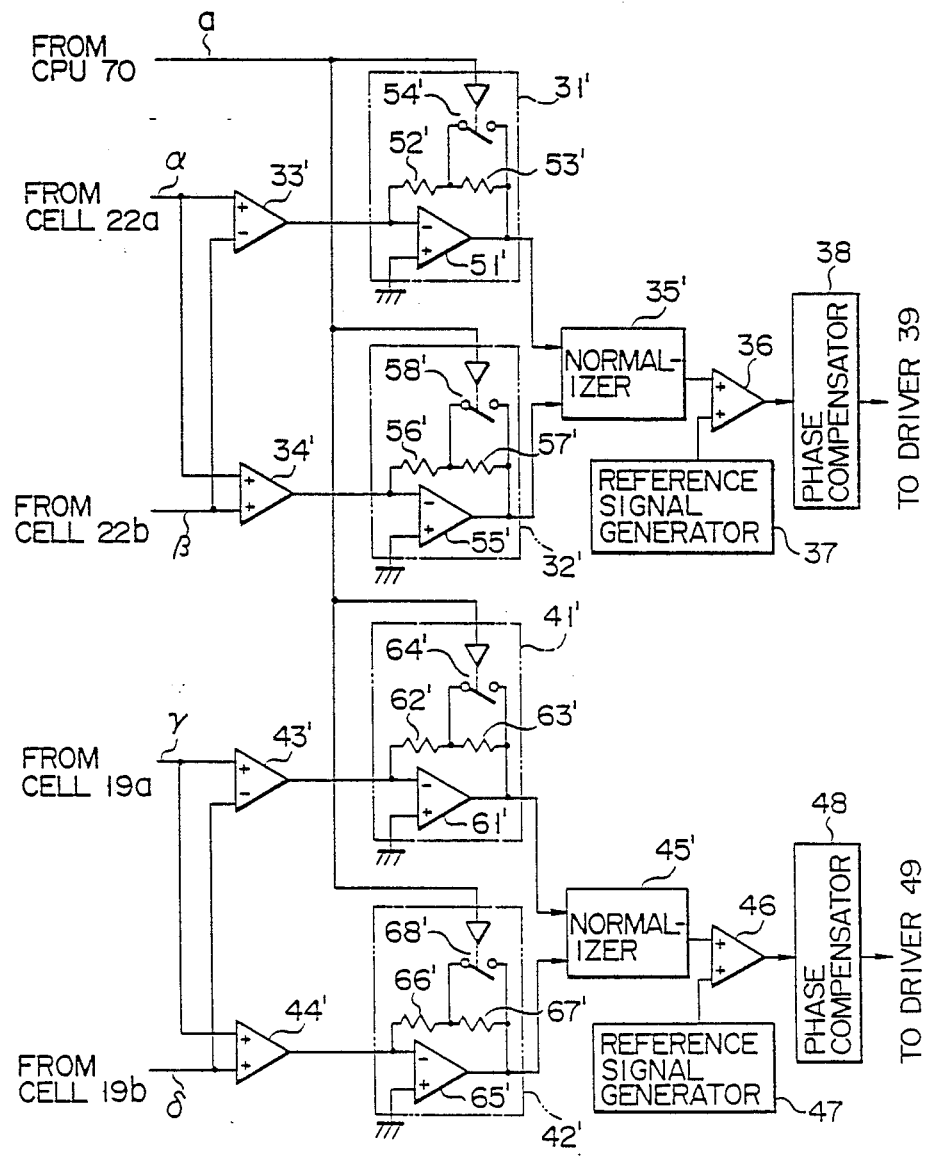
FIG. 2 shows a circuit diagram of an optical disc device as another embodiment of an optical data processor according to this invention.

In the above-mentioned embodiment, the output signals from photo cells 22a, 22b, 19a, and 19b are amplified by amplifiers 31, 32, 41, and 42, and then supplied to differential amplifiers 33 and 43, and adders 34 and 44. Alternatively, as is shown in FIG. 2, the output signals from photo cells 22a, 22b, 19a, and 19b can be applied to differential amplifies 33', 43' and adders 34' and 44'. After being amplified by amplifiers 31', 32', 41', and 42', these signals are applied to normalizers 35' and 45'. If the gains of amplifiers 31' and 32' are set such that "record mode gain/reproduction mode gain =1/A", the output signal from normalizer 35' is: "(in-record)$=(\alpha-\beta)/(\alpha+\beta)$" and "(reproduction)$=\{(\alpha-\beta)/A\}/\{(\alpha+\beta)/A\}=(\alpha-\beta)/(\alpha+\beta)$", and (in-record)=(reproduction). If the gains of amplifiers 41' and 42' are set such that "record mode gain/ reproduction mode gain=1/A", the output signal from normalizer 45' is: "(in-record)$=(\gamma-\delta)/(\gamma+\delta)$" and "(reproduction)$=\{(\gamma-\delta)/A\}/\{(\gamma+\delta)/A\}=(\gamma-\delta)/(\gamma+\delta)$", and (in-record)=(reproduction). Therefore, a wide dynamic range is not required for the normalizer, or the divider, viz., a high precision divider is not required. Therefore, there is no need for dividers that are difficult-to-use and expensive, and stable and accurate focusing and tracking can be realized.

Figure 3:
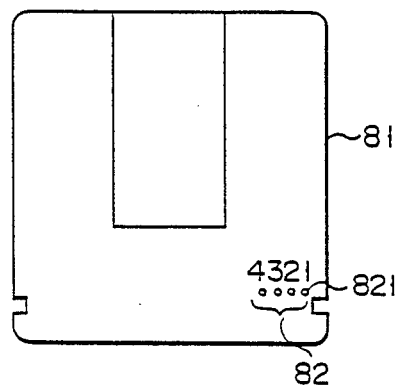
FIG. 3 is a front view showing the outward appearance of a cassette, in which an optical disk is contained.

In the above embodiments, the amplification degrees of the amplifiers are changed between the reproduction mode and the record mode. However, these amplification degrees may be changed in accordance with the reflectance of recording film 1a of optical disk 1. In this case, optical disk 1 is contained in cassette 81, such as that illustrated in FIG. 3. Cassette 81 is provided with ID holes 82 at locations determined by the International Organization for Standardization. The condition of ID hole 821 is read by use of a reading device (not shown), assuming that the reflectance of optical disk 1 can be represented by the open or closed condition of ID hole 821. If ID hole 821 is detected as being open as a result of the reading, it is determined that optical disk 1 has a high reflectance (e.g., a range of 27 to 90%). If ID hole 821 is detected as being closed, it is determined that optical disk 1 has a low reflectance (e.g., a range of 10 to 30%). In accordance with the results of the reading performed by the reading device, CPU 70 controls signal "a", thereby changing the amplification degrees of the amplifiers. For example, if the reflectance of optical disk 1 is high, the amplification degrees of the amplifiers are lowered, and if the reflectance is low, the amplication degrees are raised. By this control, a reliable operation of both the tracking and focusing control systems can be expected.

Figure 4:
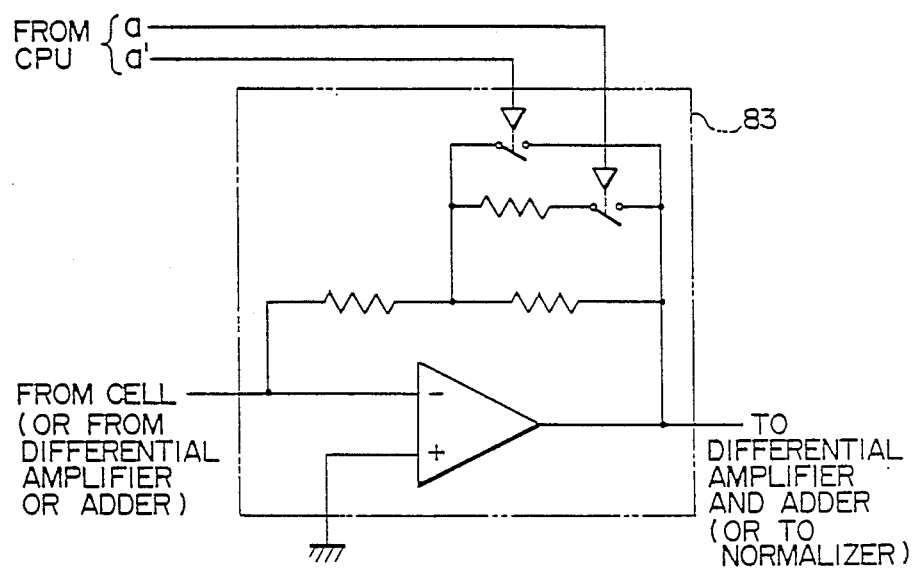
FIG. 4 is a view showing the circuit configuration of an amplifier according to still another embodiment of the present invention.

In the present invention, furthermore, the amplification degrees of the amplifiers may be controlled on the basis of both the reflectance of the optical disk and the mode (either the record mode or the reproduction mode) of the processor. In this case, each amplifier is designed such that it has an increased number of amplification degree-switching elements, as shown in FIG. 4. As can be understood from this Figure, CPU 70 produces two kinds of signals "a" and "a'" (signal "a" representing that the processor is in the record mode, and signal "a'" representing that the optical disk has a high reflectance), and the amplification degree of the amplifier 83 is changed on the basis of both signals "a" and "a'".

Needless to say, the amplification degrees can be changed in accordance with other factors, if necessary.

While the knife edge is used for the defocus detection, the astigmatism method is available for the defocus detection. The photo sensor using twin photo cells may be replaced by any other suitably structured photo sensor.

In the embodiments as mentioned above, the difference signal is divided by the sum signal, but if a variation of the input signal may be predicted, it may be replaced by an appropriate external signal. When the variation of the input signal is stepwise, an attenuator is used in place of the divider for varying the servo gain stepwise.

What is claimed is:

1. An optical data processor for recording and reproducing data to and from optical memory, comprising:
   means for generating and emitting a recording light beam to effect the recording of the data to said optical memory and a reproducing light beam to effect the reproducing of the data from said optical memory;
   means for focusing said light beam emitted from said emitting means onto said optical memory;
   means for detecting the light beam reflected from said optical memory, and for obtaining first, second, third and fourth detect signals, said first detect signal representing a degree of shifting of a focal point of the light beam in a positive direction from an exact focal point on said optical memory, said second detect signal representing a degree of shifting of the focal point of the light beam in a negative direction from said exact focal point on said optical memory, said third detect signal representing a degree of shifting of said focal point in a positive direction orthogonal to said direction represented by said first and second signals, and said fourth detect signal representing a degree of shifting of said focal point in a negative direction orthogonal to said direction represented by said first and second detect signals;

means for amplifying the first through fourth detect signals derived from said detecting means at a first amplification degree when said emitting means emits said reproducing light beam, and at a second amplification degree different from said first amplification degree when said emitting means emits said recording light beam;

means for obtaining a first drive signal corresponding to the degree of shifting of said focal point of said light beam by processing the first and second detect signals from said amplifying means and a second drive signal corresponding to the degree of shifting of said focal point in the positive and negative directions orthogonal to said direction represented by said first and second detect signals, by processing said third and fourth detect signals from said amplifying means; and means for focusing said light beam on said exact focal point on said optical memory, according to said first and second drive signals obtained by said obtaining means, so that the light beam emitted from said emitting means is focused on said exact focal point on said optical memory.

2. The optical data processor according to claim 1, wherein said amplifying means amplifies each detect signal at said first amplification degree when said emitting means emits said reproducing light beam, and at said second amplification degree when said emitting means emits said recording light beam, said second amplification degree being 1/A of said first amplification degree, where the average level of each of detect signals is A times that of each of detect signals when said emitting means emits said reproducing light beam.

3. The optical data processor according to claim 2, further comprising means for outputting a signal representing the in-record when said means receives an external record signal, and wherein the amplification degree of said amplifying means is reduced to 1/A, when said amplifying means receives the in-record signal from said signal outputting means.

4. An optical data processor for recording and reproducing data to and from optical memory, comprising:

means for generating and emitting a recording light beam to effect the recording of the data to said optical memory and a reproducing light beam to effect the reproducing of the data from said optical memory;

means for focusing said light beam emitted from said emitting means onto said optical memory;

means for detecting the light beam reflected from said optical memory, and for obtaining first, second, third and fourth detect signals, said first detect signal representing a degree of shifting of a focal point of the light beam in a positive direction from an exact focal point on said optical memory, said second detect signal representing a degree of shifting of the focal point of the light beam in a negative direction from said exact focal point on said optical memory, said third detect signal representing a degree of shifting of said focal point in a positive direction orthogonal to said direction represented by said first and second signals, and said fourth detect signal representing a degree of shifting of said focal point in a negative direction orthogonal to said direction represented by said first and second detect signals;

means for calculating the sum of and difference between said first and second detect signals and sum of and difference between said third and fourth detect signals from said detect means;

means for receiving sum and difference signals of said first and second detect signals and of said third and fourth detect signals from said calculating means and for amplifying said sum and difference signals at a first amplification degree when said emitting means emits said reproducing light beam, and at a second amplification degree different from said first amplification degree when said emitting means emits said recording light beam;

means for obtaining a first drive signal corresponding to the degree of shifting of said focal point of said light beam by dividing said difference signal by said sum signal of said first and second detect signals from said amplifying means and for obtaining a second drive signal by dividing said difference signal by said sum signal of said third and fourth detect signals from said amplifying means, said second drive signal corresponding to the degree of shifting of said focal point in the positive and negative directions orthogonal to said direction represented by said first and second signals; and means for focusing said light beam on said exact focal point on said optical memory, according to said first drive signal and said second drive signal obtained by said obtaining means, so that the light beam emitted from said emitting means is focused on said exact focal point on said optical memory.

5. The optical data processor according to claim 4, wherein said amplifying means amplifies each detect signal at said first amplification degree when said emitting means emits said reproducing light beam, and at said second amplification degree when said emitting means emits said recording light beam, and second amplification degree being 1/A of said first amplification degree, where the average level of each of detect signals is A times that of each of detect signals when said emitting means emits said reproducing light beam.

6. The optical data processor according to claim 5, further comprising means for outputting a signal representing the in-record when said means receives an external record signal, and wherein the amplification degree of said amplifying means is reduced to 1/A, when said amplifying means receives the in-record signal from said signal outputting means.

* * * * *